(12) United States Patent
Arbabi et al.

(10) Patent No.: US 9,482,796 B2
(45) Date of Patent: Nov. 1, 2016

(54) CONTROLLABLE PLANAR OPTICAL FOCUSING SYSTEM

(71) Applicant: CALIFORNIA INSTITUTE OF TECHNOLOGY, Pasadena, CA (US)

(72) Inventors: Amir Arbabi, Pasadena, CA (US); Andrei Faraon, La Canada Flintridge, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 14/610,862

(22) Filed: Jan. 30, 2015

(65) Prior Publication Data

US 2015/0219806 A1    Aug. 6, 2015

Related U.S. Application Data

(60) Provisional application No. 61/935,433, filed on Feb. 4, 2014.

(51) Int. Cl.
*G02B 1/00* (2006.01)
*G02B 5/18* (2006.01)
(Continued)

(52) U.S. Cl.
CPC ............. *G02B 5/1828* (2013.01); *G02B 1/002* (2013.01); *G02B 5/1847* (2013.01); *G02B 3/0087* (2013.01); *G02F 1/0018* (2013.01); *G03B 3/00* (2013.01); *Y10T 29/49844* (2015.01)

(58) Field of Classification Search
CPC .... G02B 5/1828; G02B 5/18; G02B 5/1804; G02B 5/1819; G02B 5/1847; G02B 1/00; G02B 1/002; G02B 3/0087; Y10T 29/49844; G02F 1/0018; G03B 3/00

USPC ................................ 359/573, 566, 576, 315
See application file for complete search history.

(56) References Cited

U.S. PATENT DOCUMENTS

| | | | | |
|---|---|---|---|---|
| 6,965,354 | B2 * | 11/2005 | Pendry | H01Q 9/0485 333/99 S |
| 2003/0227415 | A1 * | 12/2003 | Joannopoulos | B82Y 20/00 343/754 |

(Continued)

OTHER PUBLICATIONS

Aieta, Francesco, Abberations of flat lenses and aplanatic metasurfaces, Dec. 13, 2013, Optics Express, vol. 21, Issue 25, pp. 31530-31539.*

(Continued)

*Primary Examiner* — Bumsuk Won
*Assistant Examiner* — William R Alexander
(74) *Attorney, Agent, or Firm* — Steinfl & Bruno, LLP

(57) ABSTRACT

An optical device has a first metasurface disposed over a substrate. A high-contrast pattern of the first metasurface is operable for modifying, over a first phase profile, a phase front of an incident light beam. A second metasurface, is disposed over a plane parallel to the first metasurface with a second high-contrast pattern and operable for shaping, over a second phase profile, the modified phase front of the incident light beam into a converging spherical phase front. A spacer layer, in which the modified phase front of the incident light beam diffracts, is disposed in a controllably changeable separation between the first and second metasurfaces. Controllably changing the separation between the first and the second metasurfaces by a first distance correspondingly changes the position of the focus point of the converging spherical phase front by a second distance significantly greater than the first distance.

20 Claims, 13 Drawing Sheets

Example Optical System with Tunable Focus 10

(51) Int. Cl.
*G02B 3/00* (2006.01)
*G03B 3/00* (2006.01)
*G02F 1/00* (2006.01)

(56) References Cited

U.S. PATENT DOCUMENTS

| | | | | |
|---|---|---|---|---|
| 2005/0007567 | A1* | 1/2005 | Pierrat | B82Y 10/00 355/18 |
| 2007/0171536 | A1* | 7/2007 | Tsukagoshi | B82Y 20/00 359/642 |
| 2009/0079644 | A1* | 3/2009 | May | H01Q 19/06 343/753 |
| 2010/0277807 | A1* | 11/2010 | Bowers | G02B 27/40 359/642 |
| 2012/0328240 | A1* | 12/2012 | Ma | B82Y 20/00 385/33 |
| 2013/0143149 | A1* | 6/2013 | Kang | G03F 1/38 430/5 |
| 2013/0314765 | A1* | 11/2013 | Padilla | G01K 7/003 359/315 |
| 2014/0298900 | A1* | 10/2014 | Clarke | E21B 49/00 73/152.55 |

OTHER PUBLICATIONS

Yu, Nanfang, and Capasso, Federico, Flat Optics with designer metasurfaces, Feb. 2014, Nature Materials, vol. 13, pp. 139-150.*
T. Krupenkin, S. Yang, and P. Mach, "Tunable liquid microlens," *Appl. Phys. Lett.*, vol. 82, No. 3, pp. 316-318, 2003.
N. Sugiura and S. Morita, "Variable-focus liquid-filled optical lens," *Appl. Opt.*, vol. 32, No. 22, pp. 4181-4185, 1993.
S.-Y. Lee, H.-W. Tung, W.-C. Chen, and W. Fang, "Thermal actuated solid tunable lens," *IEEE Photon. Technol. Lett.*, vol. 18, No. 21, pp. 2191-2193, Nov. 2006.
O. Pishnyak, S. Sato, and O. D. Lavrentovich, "Electrically tunable lens based on a dual-frequency nematic liquid crystal," *Appl. Opt.* vol. 45 No. 19, 4576-4582 (2006).
A. Arbabi, Y. Horie, M. Bagheri, and A. Faraon. "Complete Control of Polarization and Phase of Light with High Efficiency and Sub-wavelength Spatial Resolution." arXiv preprint arXiv:1411.1494; Cornell University http://arxiv.org/abs/1411.1494 pp. 1-10 (2014).
A. Arbabi, Y. Horie, A. J. Ball, M. Bagheri, and A. Faraon. "Subwavelength-thick Lenses with High Numerical Apertures and Large Efficiency Based on High Contrast Transmitarrays." arXiv preprint arXiv:1410.8261; Cornell University http://arxiv.org/abs/1410.8261 pp. 1-10 (2014).

* cited by examiner

Example intensity profile 21: Light between 1st & 2nd Metasurfaces (logarithmic scale)

Example intensity profile 22: light after 2nd Metasurface
(47.5μm Separation between 1st & 2nd Metasurfaces)

Example intensity profile of light after 2nd metasurface
(11.8μm Separation between 1st & 2nd Metasurfaces)

Example Metasurface 30

Example transmission characteristics 35

Example Diffraction Metasurface Finite Distance (5μm) Time Domain 41

Example Amplitude 42

(Light intensity at distances away from Metasurface)

Example Metasurface 51 fabricated on Substrate surface 52

(Micrograph at 1st Magnification 'Mag.A' showing example dimensions)

Example Array 52: Circular Posts 53 of Microsurface (Micrograph at 2nd Magnification 'Mag.B'; Mag.B > Mag.A)

Example Implantable Inter-ocular Optical Telescope 810

Example Optical Endoscope Apparatus 820

Example Laser Lithography Apparatus 830

CONTROLLABLE PLANAR OPTICAL FOCUSING SYSTEM

CROSS REFERENCE TO RELATED APPLICATIONS

The present application claims priority to U.S. Provisional Patent Application No. 61/935,433 filed Feb. 4, 2014, which is incorporated herein by reference in its entirety.

STATEMENT OF U.S. GOVERNMENT INTEREST

The invention described herein was made in the performance of work under a NASA contract, and is subject to the provisions of Public Law No. 96-517 (35 U.S.C. §202), in which the Contractor has elected to retain title.

FIELD

The present disclosure relates generally to optics. More particularly, an example embodiment of the present disclosure relates to optical systems operable for controllably focusing light.

SUMMARY

Example embodiments of the present disclosure relate to optical systems operable for controllably focusing light. The optical systems focus incident beams of light at typical optical (infrared, visible, ultraviolet) wavelengths and electromagnetic radiation spanning other wavelength ranges (radio, microwave, x-ray).

In an example embodiment, the optical system comprises at least a pair of high contrast layers, each disposed over a planar surface opposing that of the other across a separation. The high contrast layers are referred to herein by the term "metasurfaces." As used herein, the term "high contrast" refers to a contrast between the refractive index of materials from which the metasurfaces are made and the refractive index of materials surrounding (or otherwise disposed in close proximity to the metasurfaces). The optical system is operable for adjusting a location of its focal plane. The location of the focal plane is adjustable by varying dimensions of the separation between the parallel metasurfaces by small amounts.

Example embodiments relate to implementation of optical systems at low cost using mass production and standard microfabrication techniques, e.g., as used in manufacture of silicon chips and related electronics. Light weight optical systems may thus be implemented with very low profiles, relative to typical optics using conventional focus components. Example embodiments relate to implementation of miniaturized and implantable microscopes and endoscopes, and to 3D laser lithography and stereolithography, which comprise the disclosed optical system operable for adjusting its focal plane.

An example embodiment relates to an optical device comprising a substrate and a first metasurface disposed upon the substrate. The first metasurface comprises a first high-contrast pattern operable for modifying, over a first phase profile, a phase front of a narrow-band or monochromatic collimated light beam incident to the first metasurface.

A second metasurface is disposed over a plane parallel to the first metasurface. The second metasurface comprises a second high-contrast pattern operable for shaping, over a second phase profile, the phase front of the modified phase front of the incident light beam into a converging spherical phase front. A spacer layer, in which the modified phase front of the incident light beam diffracts is disposed in a separation between the first metasurface and the second surface.

The separation relates to a focus point of the converging spherical phase front beyond the second metasurface, relative to the first metasurface, in as direction of propagation of the incident light beam. Providing a change in the separation causes a corresponding significant change in the focus point.

Controllably changing the controllable separation between the first metasurface and the second metasurface by a first distance correspondingly changes the position of the focus point of the converging spherical phase front by a second distance, wherein the second distance exceeds the first distance to a significant degree.

The separation may comprise an adjustable distance between the first metasurface and the second metasurface. The adjustable distance may be adjustable tunably. For example, the adjustable distance may be adjustable by tuning a modulation signal directed to the optical device, to which the device is responsive. The significant change in the focus point may comprise a multiple of up to three orders of magnitude (1000:1) relative to the change in the separation.

In an example embodiment, changing the separation distance between the first metasurface and the second metasurface may be implemented tunably using piezoelectric and/or electrostatic actuation and/or modulation. The separation distance between the first metasurface and the second metasurface may also be implemented using MEMS related actuation and/or modulation approaches.

The substrate may comprise silicon. The optical device may also comprise at least a first membrane disposed over the substrate wherein the first metasurface is disposed over the first membrane. Optionally, the optical device may also comprise a second membrane. One (or more) of the metasurfaces may be disposed on a substrate, which comprises an optically transparent material. The second metasurface is disposed over the second membrane.

The first membrane and/or the second membrane may comprise a free standing thin film material such as silicon nitride. The first membrane and/or the second membrane may also comprise silicon oxide.

The narrow band (and/or the monochromatic light) may comprise a portion of an infrared, visible or ultraviolet spectral region over which the optical device is operable. The narrow band and/or monochromatic light may also comprise a portion of an electromagnetic radiation spectrum over which the device may be operable at a radio, microwave, x-ray or other frequency region.

The first metasurface and/or the second metasurface may comprise a periodic or quasi-periodic array of elements, each of which comprises a sub-wavelength dimension, which is smaller than a shortest wavelength of the narrow band.

A refractive property of the first metasurface and/or the second metasurface may relate to a parameter associated with the periodic or quasi-periodic arrays of each. For example, the parameter associated with the periodic or quasi-periodic array may comprise a size and/or a shape of a lattice feature of the periodic or quasi-periodic array. The parameter associated with the periodic or quasi-periodic array may also comprise a size and/or a shape of one or more of a plurality of unit elements, which comprise the lattice.

An example embodiment is also described in relation to a process for fabricating an optical device. The process may relate to silicon based micro-fabrication technologies.

Further, an example embodiment is described in relation to an optical system. The optical system may be disposed in various apparatus, such as miniaturized microscopes, endoscopes, and telescopes. These apparatus may be implantable in a body of a medical patient or a physiological subject. The optical apparatus may also relate to stereolithography and 3D laser lithography.

BRIEF DESCRIPTION OF THE DRAWINGS

In relation to the following description of example embodiments, each figure of the drawings comprises a part of the specification of the present Application, no particular scale applies (unless stated particularly otherwise, e.g., the scales applied over both of the axes shown in FIG. 2A-FIG. 2C, inclusive.

FIG. 3B depicts an example transmission amplitude and an example phase shift of a plane wave normally incident on the periodic array (depicted in FIG. 3A), according to an example embodiment of the present disclosure;

FIG. 4A depicts finite difference time domain simulation results computed for an example metasurface designed to diffract the incident beam, according to an embodiment of the present disclosure;

FIG. 4B depicts an example amplitude distribution computed for the light away from the metasurface (depicted in FIG. 4A), according to an embodiment of the present disclosure;

FIG. 5A depicts a scanning electron micrograph of an example metasurface fabricated on a silicon substrate, according to an example embodiment of the present disclosure;

DETAILED DESCRIPTION OF EXAMPLE EMBODIMENTS

Figure 1:
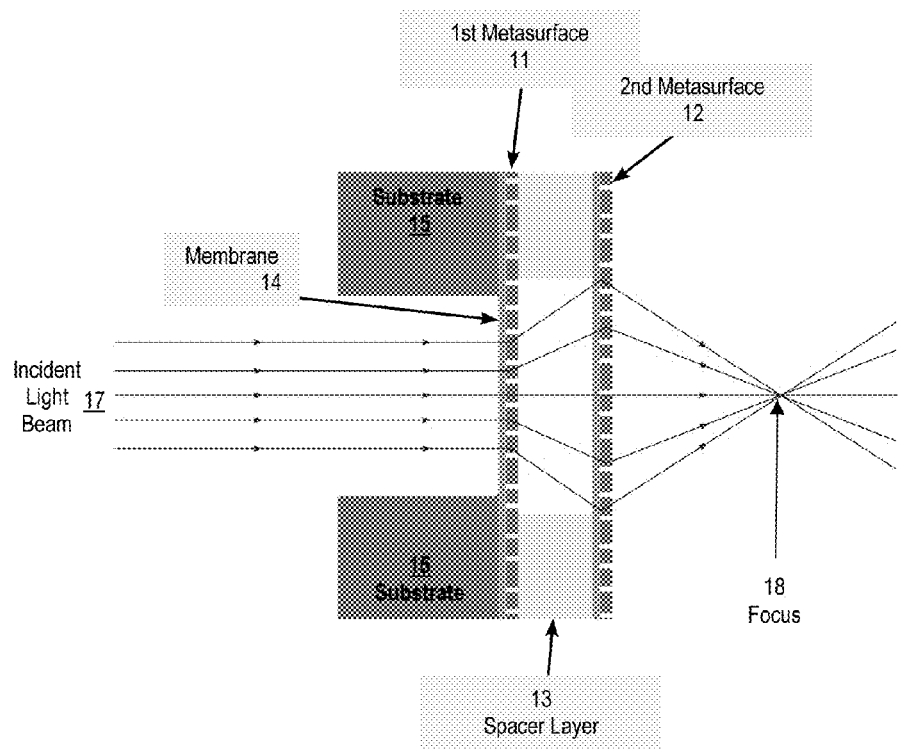
FIG. 1 depicts an example optical system with tunable focus, according to an example embodiment of the present disclosure.

Example embodiments of the present disclosure relate to optical systems operable for controllably focusing light. The optical systems focus incident beams of light at typical optical (infrared, visible, ultraviolet) wavelengths and may also be operable with electromagnetic radiation spanning other wavelength ranges.

An example embodiment is described in relation to an optical system comprising at least a pair of high contrast layers, each disposed over a planar surface opposing that of the other across a separation. The high contrast layers are referred to herein by the term "metasurfaces." Example embodiments relate to optical systems operable for adjusting a location of their focal planes. The location of the focal plane is adjustable by varying dimensions of the separation between the parallel metasurfaces by small amounts.

Devices with rapidly tunable focal length include microlenses with adjustable focus. Such microlenses function typically tune their foci by changing their geometrical characteristics or refractive index profiles. Conventional approaches to tuning the foci of microlenses have included changing the contact angle of a liquid droplet and a solid surface using a process related to electro-wetting [Ref.1], and modifying profiles of a liquid droplet [Ref.2] or a polymer droplet [Ref.3] by introducing variation into their volumes.

Variation has typically been introduced into the volumes of liquid and polymeric droplets by increasing or decreasing the volume of liquid pumped into the droplet, or by expanding droplets and/or contracting droplets by adding or removing thermal energy therefrom. For example, heating the droplets adds thermal energy thereto and thus expands their volumes. Alternatively or additionally, cooling the liquid or polymer material of the droplets removes thermal energy therefrom, and thus reduces the droplet volumes by contraction.

Another conventional approach creates a graded index profile in a liquid crystal layer using a non-uniform electrostatic field [Ref.4] to which the layer is exposed. Although using these conventional approaches allow microlenses with tunable focal lengths, the lenses thus produced remain too large, and the tuning process remains too slow, for practical use with some significant modern optical and electro-optical applications.

In contrast, an example embodiment of the present disclosure relates to optical systems having low profiles and fast focal length tuning, at speeds sufficient to support modern optical and electro-optical applications. An example embodiment relates to an optical device comprising a substrate and a first metasurface disposed upon the substrate. The first metasurface comprises a first high-contrast pattern operable for modifying, over a first phase profile, a phase front of a narrow-band or monochromatic collimated light beam incident to the first metasurface.

A second metasurface is disposed over a plane parallel to the first metasurface. The second metasurface comprises a second high-contrast pattern operable for shaping, over a second phase profile, the phase front of the modified phase front of the incident light beam into a converging spherical phase front. A spacer layer, in which the modified phase front of the incident light beam diffracts is disposed in a separation between the first metasurface and the second surface.

The separation relates to a focus point of the converging spherical phase front beyond the second metasurface, relative to the first metasurface, in as direction of propagation of the incident light beam. Providing a change in the separation causes a corresponding significant change in the focus point.

Controllably changing the controllable separation between the first metasurface and the second metasurface by a first distance correspondingly changes the position of the focus point of the converging spherical phase front by a second distance, wherein the second distance exceeds the first distance to a significant degree.

FIG. 1 depicts an example optical system 10 with tunable focus, according to an embodiment of the present disclosure. The system 10 comprises two parallel metasurfaces 11 and 12, which diffract, and then focus an incident light beam 17. The location of the focus point 18 of the system 10 is adjusted by varying the separation between the two parallel metasurfaces 11 and 12.

The input beam comprises a collimated beam of monochromatic or narrow-band light. Example embodiments may be implemented in which the incident beam comprises light at any optical (infrared, visible, ultraviolet) wavelength. Embodiments are not limited to such optical wavelengths however. On the contrary, example embodiments may be implemented in which the incident beam comprises electromagnetic radiation spanning any other wavelength range (radio, microwave, x-ray).

The first metasurface functions as a phase mask and modifies the phase front of the input beam. The beam with the modified phase front travels the distance between the two metasurfaces and undergoes diffraction as it propagates. The second metasurface also functions as a phase mask, but it has a different phase profile from the first metasurface. The purpose of the second metasurface is to focus the light incident on it, so it modifies the phase front of the beam and shapes it in the form of a converging spherical phase front. The phase mask of the first metasurface is chosen such that the light passed through it diffracts in such a way that when the separation between the two metasurfaces is changed by a small amount, the phase front of the light at the second metasurface plane is modified significantly and in a such a way that the location of the focus is moved by a large amount.

Figure 2A:
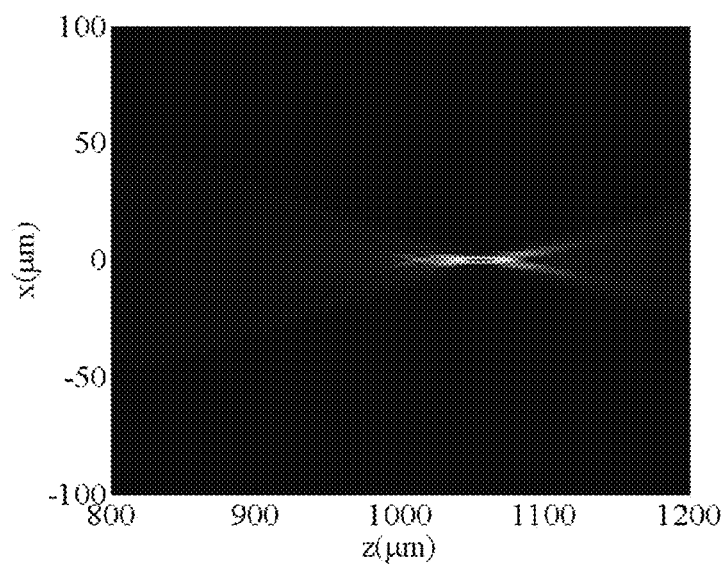
FIG. 2A depicts an example profile, which represents the intensity of the light between the two metasurfaces, plotted over a logarithmic scale, according to an embodiment of the present disclosure.
Figure 2B:
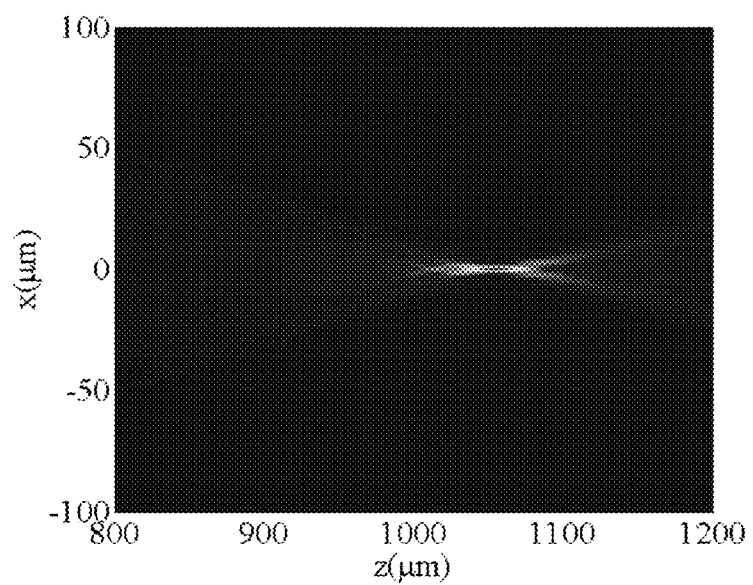
FIG. 2B depicts an example profile, which represents the intensity of the light after the second metasurface with a first separation of a first dimension disposed between the second metasurface and the first metasurface, according to an embodiment of the present disclosure.
Figure 2C:
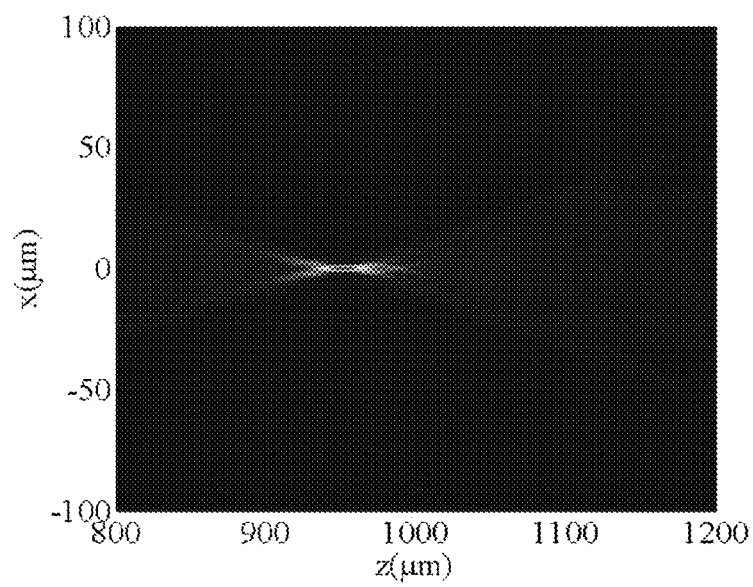
FIG. 2C depicts an example profile, which represents the intensity of the light after the second metasurface with a second separation of a second dimension disposed between the second metasurface and the first metasurface, according to an embodiment of the present disclosure.

FIG. 2A, FIG. 2B and FIG. 2C each depict example simulated intensity profiles computed in relation to light inside and outside the focusing system, according to an embodiment of the present disclosure. FIG. 2A depicts an example profile 21, which represents the intensity of the light between the two metasurfaces, plotted over a logarithmic scale. FIG. 2B depicts an example profile 22, which represents the intensity of the light after the second metasurface with a first separation of 8.2 micrometers ($\mu m$) disposed between the second metasurface and the first metasurface.

FIG. 2C depicts an example profile 23, which represents the intensity of the light after the second metasurface with a second separation of 11.8 $\mu m$ disposed between the two parallel metasurfaces. In profile 21, the z=0 plane corresponds to the location of the first metasurface. In profile 22 and profile 23, the z=0 plane corresponds to the location of the second metasurface. The profiles 21, 22 and 23, inclusive, represent simulations computed in relation to input light comprising a Gaussian beam with beam waists of $W_0$=30 $\mu m$ and a monochromatic wavelength of $\lambda$=930 nm (nanometers).

The example input beam has a wavelength $\lambda$=930 nm and comprises a Gaussian input with a waist radius of 30 $\mu m$, propagating along the z axis. The first metasurface 11 and the second metasurface 12 are located in the x-y plane and are separated by a distance of 10 $\mu m$ from each other. In profile 21, the intensity of the light in the x-z cross sectional plane is plotted in the logarithmic scale. The simulation is performed using computation related to the plane wave expansion method and the metasurfaces 11 and 12 are modeled as phase masks.

Profile 22 and profile 23 depict diffraction of the beam after passing through the first metasurface, and the focus of the diffracted light after passing through the second metasurface. Profile 22 represents the separation between the two metasurfaces at a distance of 8.2 $\mu m$. Profile 23 represents the separation between the two metasurfaces at a distance of while it is 48.5 $\mu m$. While the separation distance between the two lenses changes by 3.6 $\mu m$, the location of the focus moves correspondingly by approximately 0.1 mm, which comprises ratio of 3.6:100; two orders of magnitude.

The phase masks required for realizing the adjustable focus functionality may be implemented using high contrast layers patterned with subwavelength features. As used herein, the term subwavelength features refers to elements comprising the phase masks as having dimensions smaller than the wavelength of the monochromatic beam or the smallest wavelength of the narrow band over which the optical system is operable. In an example embodiment, arbitrary phase masks may be implemented by gradually varying in-plane geometrical features characterizing periodically or quasi-periodically arrayed structures.

Figure 3A:
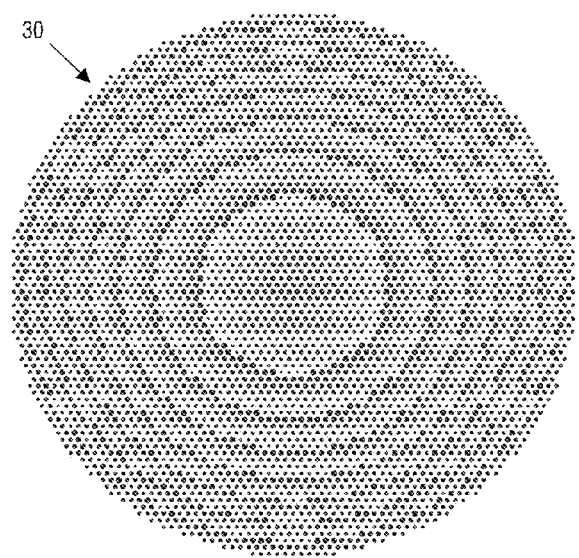
FIG. 3A depicts an example metasurface, according to an embodiment of the present disclosure.
Figure 3B:
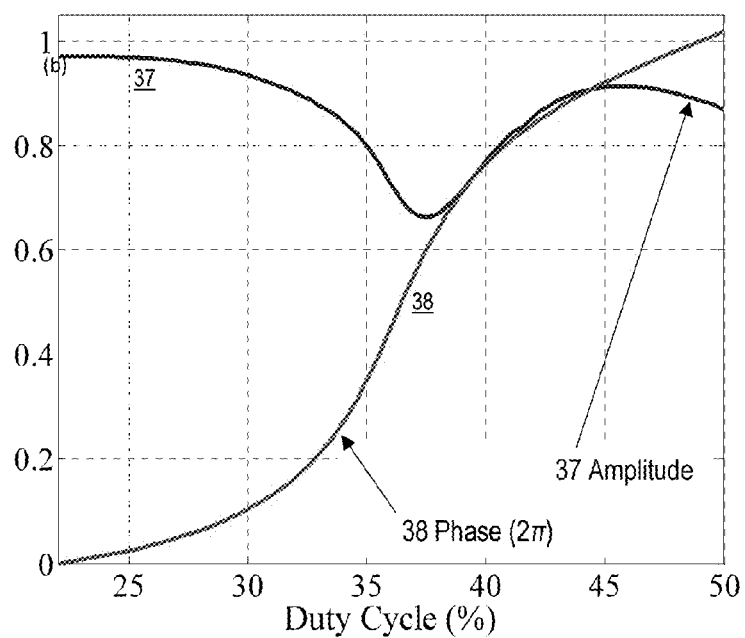
FIG. 3B.

FIG. 3A depicts an example metasurface 300, according to an embodiment of the present disclosure. FIG. 3B depicts an example transmission amplitude 31 and an example phase shift 38 of a plane wave normally incident on the periodic array 300 (FIG. 3A), according to an example embodiment of the present disclosure.

An example embodiment may be implemented in which the metasurface 300 is created by gradually varying the duty cycles, which correspond to the changing radii of circular posts 302-399, inclusive, disposed over a hexagonal periodic array 301 of silicon posts. FIG. 3B depicts the transmission amplitude 31 and phase shift 32 of a plane wave normally incident on the periodic array 310, according to an example embodiment of the present disclosure.

An example of phase mask is created by changing the radii and equivalently, duty cycles, of silicon posts arranged in a hexagonal lattice. A phase shift is imposed when the light passes through such a metasurface. The phase shift can be approximated at each point on the structure by its corresponding value for a periodic structure having a duty cycle that matches the local duty cycle of the metasurface [Ref.5] and [Ref.6]. The simulated values of the phase shift that a periodic structure imposes on a normally incident light is shown in FIG. 3B.

The example periodic structure 300 comprises a plurality of 0.4 $\mu m$ tall circular silicon posts, which are disposed over a 3 $\mu m$ thick silicon dioxide membrane. The posts are arranged in a hexagonal lattice with a lattice constant of 0.34 $\mu m$. The computed simulation shown is performed at the $\lambda$=633 nm wavelength.

The phase shift imposed by the periodic structure can be changed from 0 to $2\pi$ by varying the duty cycle of the structure from 22% to 50%. The amplitude of the transmission shows significant transmission at the 633 nm wavelength, where silicon is characteristically absorbing. Phase masks may thus be implemented using a periodic structure and a curve selectively similar to those represented in FIG. 3B.

Figure 4A:
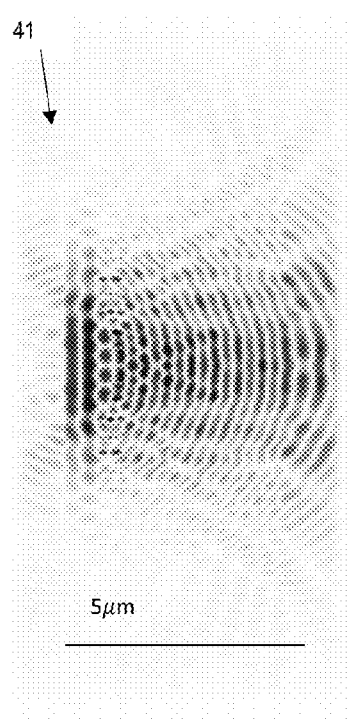
FIG. 4A-4B, inclusive.

FIG. 4A depicts a finite difference time domain simulation 41 computed for an example metasurface designed for operably diffracting the incident beam, according to an embodiment of the present disclosure. The finite difference time domain simulation 41 conforms to a metasurface that diffracts the incident beam. The diffracting phase mask is created by gradually varying the duty cycle according to the phase curve shown in of FIG. 3B.

Figure 4B:
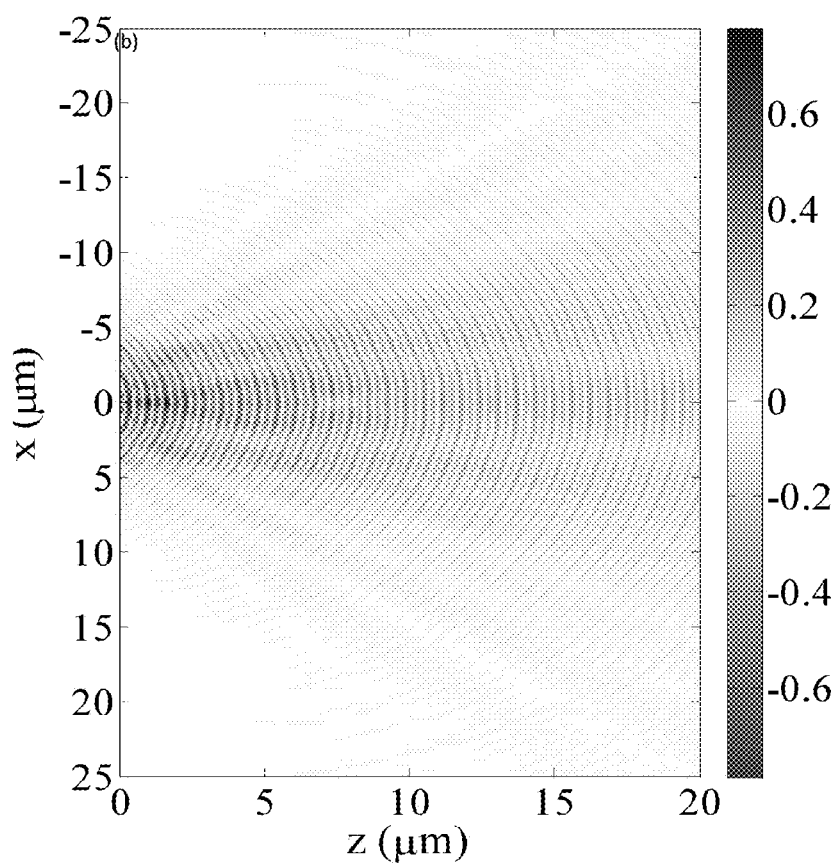

FIG. 4B depicts an example amplitude distribution computed for the light away from the metasurface (depicted in FIG. 4A), according to an embodiment of the present disclosure. The diffracted light is further away from the second metasurface (relative to its surface opposite from the first metasurface). As the diffraction pattern is similar to that of the example intensity profile 21 (FIG. 2A), the first metasurface 11 of the focusing system 10 (FIG. 1) may thus be designed accordingly.

The optical focusing system 10 (FIG. 1) may be implemented using silicon micro-fabrication techniques known to artisans skilled in technologies related to optics, electro-optics and/or semiconductor processes.

Figure 5A:
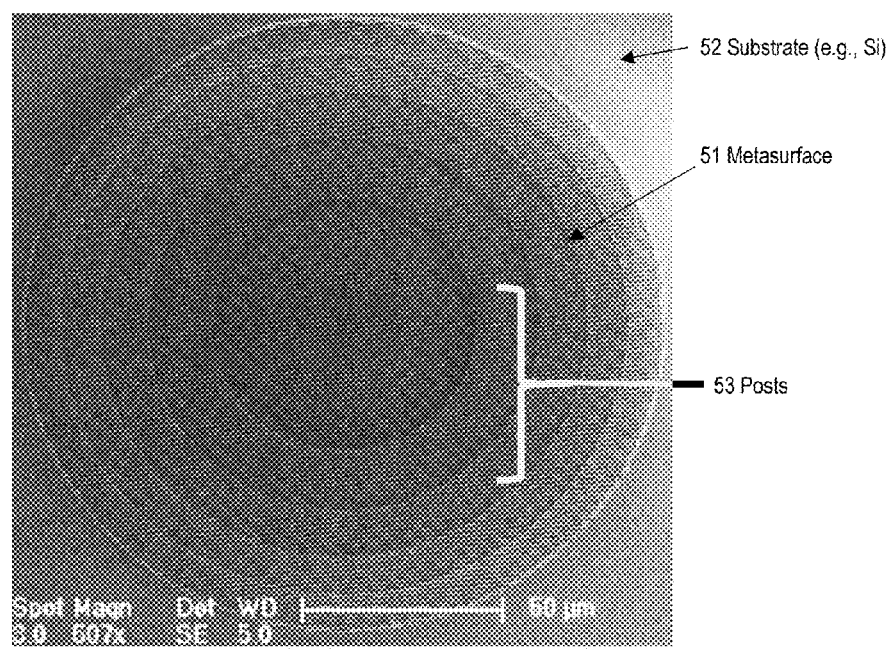
FIG. 5A)
Figure 5B:
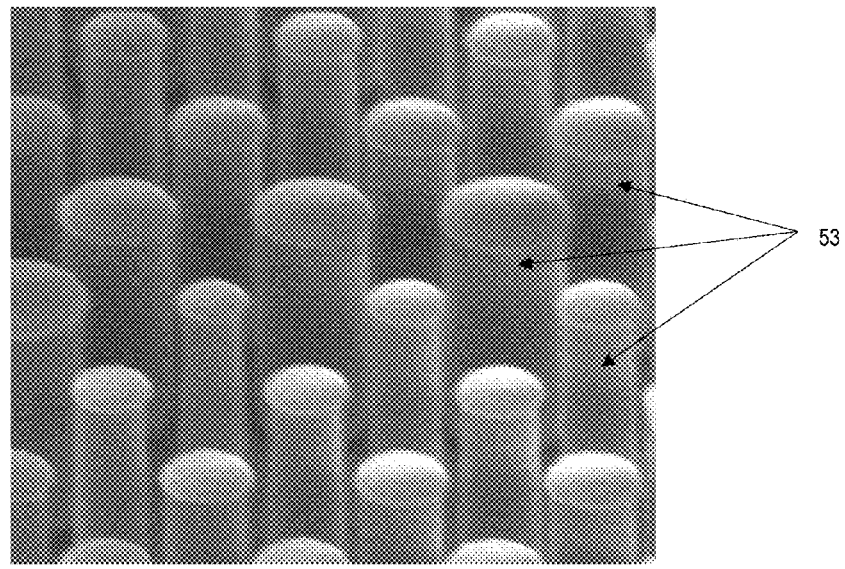
FIG. 5B depicts a scanning electron micrograph (at a higher magnification) of the metasurface (depicted in FIG. 5A), as comprising an example array of circular posts, according to an example embodiment of the present disclosure.

FIG. 5A depicts a scanning electron micrograph of an example metasurface 51 fabricated on a silicon substrate 52, according to an example embodiment of the present disclosure. The metasurface 51 comprises of an array 53 of silicon posts. The example micrograph is shown at a first magnification. FIG. 5B depicts a scanning electron micrograph at a second magnification, which is greater than the first magnification (FIG. 5A) of the metasurface. The second magnification renders the posts 53 more perceptible.

An example embodiment may be implemented in which the first metasurface 11 and the second metasurfaces 12 (FIG. 1) are fabricated on free standing thin film membranes comprising silicon nitride. The membranes may also be fabricated using silicon dioxide. Displacement operations, such as for changing the separation distance between the first metasurface 11 and the second metasurface 12 may be implemented using actuation techniques known to artisans skilled in technologies related to optics, electro-optics and/or semiconductor processes. For example, the actuation operations may comprise piezoelectric and/or electrostatic actuation and/or modulation approaches similar or analogous to those used with micro-electromechanical systems (MEMS) and similar technologies.

An example embodiment thus relates to an optical device comprising a substrate and a first metasurface disposed upon the substrate. The first metasurface comprises a first high-contrast pattern operable for modifying, over a first phase profile, a phase front of a narrow-band or monochromatic collimated light beam incident to the first metasurface.

A second metasurface is disposed over a plane parallel to the first metasurface. The second metasurface comprises a second high-contrast pattern operable for shaping, over a second phase profile, the phase front of the modified phase front of the incident light beam into a converging spherical phase front. A spacer layer, in which the modified phase front of the incident light beam diffracts is disposed in a separation between the first metasurface and the second surface.

The separation relates to a focus point of the converging spherical phase front beyond the second metasurface, relative to the first metasurface, in as direction of propagation of the incident light beam. Providing a change in the separation causes a corresponding significant change in the focus point.

Controllably changing the controllable separation between the first metasurface and the second metasurface by a first distance correspondingly changes the position of the focus point of the converging spherical phase front by a second distance, wherein the second distance exceeds the first distance to a significant degree.

The separation may comprise an adjustable distance between the first metasurface and the second metasurface. The adjustable distance may be adjustable tunably. For example, the adjustable distance may be adjustable by tuning a modulation signal directed to the optical device, to which the device is responsive. The significant change in the focus point may comprise a multiple of up to three orders of magnitude (1000:1) relative to the change in the separation.

In an example embodiment, changing the separation distance between the first metasurface and the second metasurface may be implemented tunably using piezoelectric and/or electrostatic actuation and/or modulation. The separation distance between the first metasurface and the second metasurface may also be implemented using MEMS related actuation and/or modulation approaches.

The substrate may comprise silicon. The optical device may also comprise at least a first membrane disposed over the substrate wherein the first metasurface is disposed over the first membrane. Optionally, the optical device may also comprise a second membrane. The second metasurface is disposed over the second membrane.

The first membrane and/or the second membrane may comprise a free standing thin film material such as silicon nitride. The first membrane and/or the second membrane may also comprise silicon oxide.

The narrow band (and/or the monochromatic light) may comprise a portion of an infrared, visible or ultraviolet spectral region over which the optical device is operable. The narrow band and/or monochromatic light may also comprise a portion of an electromagnetic radiation spectrum over which the device may be operable at a radio, microwave, x-ray or other frequency region.

The first metasurface and/or the second metasurface may comprise a periodic or quasi-periodic array of elements, each of which comprises a sub-wavelength dimension, which is smaller than a shortest wavelength of the narrow band.

A refractive property of the first metasurface and/or the second metasurface may relate to a parameter associated with the periodic or quasi-periodic arrays of each. For example, the parameter associated with the periodic or quasi-periodic array may comprise a size and/or a shape of a lattice feature of the periodic or quasi-periodic array. The parameter associated with the periodic or quasi-periodic array may also comprise a size and/or a shape of one or more of a plurality of unit elements, which comprise the lattice.

Figure 6:
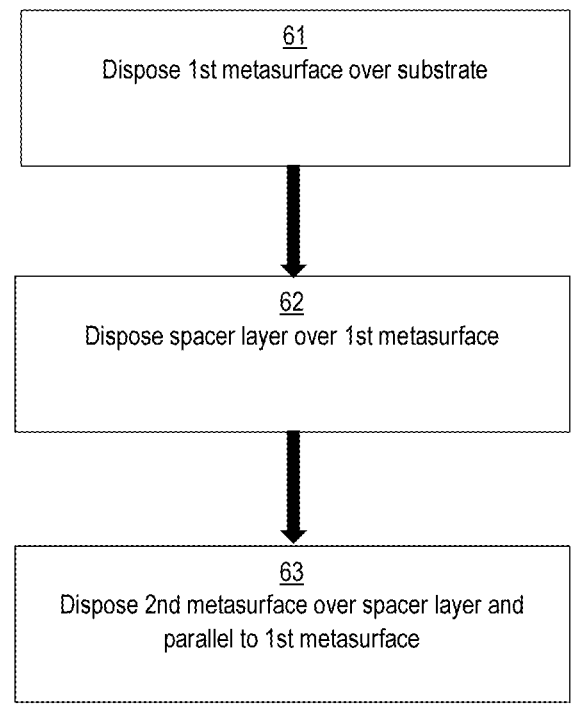
FIG. 6 depicts a flowchart for an example process for fabricating an optical device with a tunable focus, according to an embodiment of the present disclosure.

FIG. 6 depicts a flowchart for an example process 60 for fabricating an optical device with a tunable focal plane, according to an embodiment of the present disclosure. The process 60 for fabricating an optical device begins with a step 61, in which a first metasurface is disposed over a substrate.

The first metasurface comprises a first high-contrast pattern operable for modifying, over a first phase profile, a phase front of a narrow-band or monochromatic collimated light beam incident to the first metasurface. In step 62, a spacer layer is disposed over the first metasurface.

In step 63, a second metasurface is disposed over the spacer layer on a plane parallel to the first metasurface. The second metasurface comprises a second high-contrast pattern operable for shaping, over a second phase profile, the phase front of the modified phase front of the incident light beam into a converging spherical phase front. The modified phase front of the incident light beam diffracts as it propagates through the spacer layer, which is disposed in a separation between the first metasurface and the second surface. The spacer layer disposed in step 62 over the first metasurface is disposed in (installed within) a space corresponding to the separation between the first metasurface and the second metasurface. (Thus, step 63 may be performed temporally prior to performance of the step 62.)

The separation relates to a focus point of the converging spherical phase front beyond the second metasurface, relative to the first metasurface, in a direction of propagation of the incident light beam. A change in the separation causes a corresponding significant change in the focus point. The significant change may comprise a multiple of three orders of magnitude relative to a magnitude of the change in the separation between the first and the second metasurfaces.

Disposing the first metasurface and/or disposing the second metasurface may comprise disposing a periodic or quasi-periodic array of elements, each of which comprises a sub-wavelength dimension, which is smaller than a wavelength corresponding to the monochromatic light or of the smallest wavelength of the narrow band. An optical operating range of the optical device relates to a parameter characterizing the first metasurface and/or the second metasurface.

The parameter of the first metasurface and/or the second metasurface may relate to a size and/or a shape of a lattice associated with the first and/or the second metasurfaces. The parameter of the first metasurface and/or the second metasurface may also relate to a size and/or a shape of each of a plurality of unit elements, which comprise the lattice.

The fabrication process 60 may also comprise disposing at least a first membrane over the substrate. The disposing of the first metasurface (step 61) may thus comprise disposing the first metasurface on the at least first membrane.

The fabrication process 60 may optionally also comprise disposing a second membrane on a surface of the spacer component opposite from the first metasurface and over the plane parallel thereto. The disposing of the second metasurface may thus comprise disposing the second metasurface over the second membrane. The first membrane and/or the second membrane may comprise a free standing thin film material. The first membrane and/or the second membrane may each comprise silicon nitride or silicon dioxide.

Figure 7:
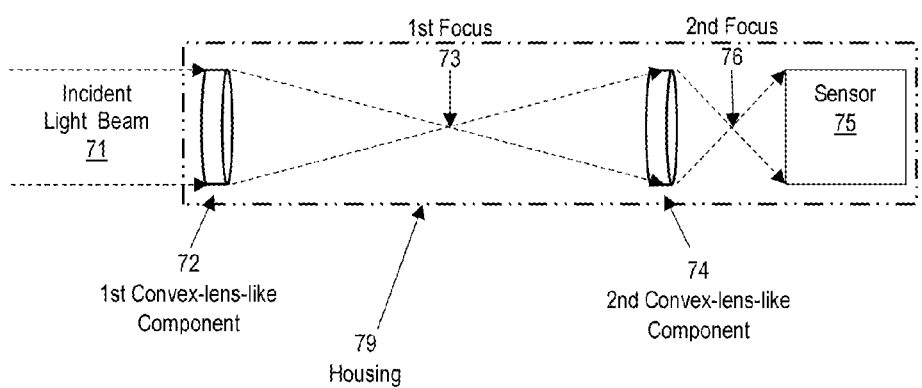
FIG. 7 depicts an example optical apparatus, according to an embodiment of the present disclosure.

FIG. 7 depicts an example optical system 70, according to an embodiment. The optical system 70 comprises a first convex-lens-like component 72 and at least a second convex-lens-like component 74. The first convex-lens-like component 72 is operable for focusing a beam of light 71 incident to the optical system to a first focus 73 beyond a surface of the first convex-lens-like component 72 opposite from the direction of incidence, and towards the direction of propagation of the incident light beam 71.

The at least second convex-lens-like component 74 is operable for gathering at least a portion of the focused incident light beam 71 from beyond the first focus 73 of the first convex-lens-like component 72, relative to the direction of propagation of the incident light beam 71, and for focusing the at least portion of the gathered incident light beam 71 to a second focal point 76 beyond a surface of the second convex-lens-like component 74 relative to a direction of propagation of the incident light beam 71. The first convex-lens-like component 72 and/or the second convex-lens-like component 74 each comprise a substrate (e.g., substrate 15; FIG. 1).

A first metasurface (e.g., first metasurface 11; FIG. 1) is disposed upon the substrate. The first metasurface comprises a first high-contrast pattern operable for modifying, over a first phase profile, a phase front of a narrow-band collimated light beam incident to the first metasurface. A second metasurface (e.g., second metasurface 12; FIG. 1) is disposed over a plane parallel to the first metasurface.

The second metasurface comprises a second high-contrast pattern operable for shaping, over a second phase profile, the phase front of the modified phase front of the incident light beam into a converging spherical phase front. A spacer layer (e.g., spacer layer 13; FIG. 1), in which the modified phase front of the incident light beam 71 diffracts, is disposed in a separation of a certain dimension between the first metasurface and the second surface.

The separation relates to a focus of the converging spherical phase front beyond the second metasurface, relative to the first metasurface, in a direction of propagation of the incident light beam. A change in the separation causes a corresponding significant change in the focus. The change may be actuated in response to piezoelectric and/or electrostatic actuation and/or modulation operations and/or actuations/modulation approaches related to MEMS.

Controllably changing the controllable separation between the first metasurface and the second metasurface by a first distance correspondingly changes the position of the focus point of the converging spherical phase front by a second distance, wherein the second distance exceeds the first distance to a significant degree.

A sensor 75 such as a photodiode array or a charge coupled device (CCD) may be disposed to receive an optical output of the modified light beam 71 opposite from the second convex-lens-like component 74 in relation to the second focus point 76.

The optical system 70 may comprise a miniaturized apparatus. The miniaturized apparatus may comprise a microscope, an endoscope or a telescope. The miniaturized apparatus may be disposed in a sealed protective housing and may be implantable into a body of a medical patient or a physiological or other biological specimen. The miniaturized apparatus may also comprise a 3D (three-dimensional) laser lithography apparatus and/or an apparatus related to stereolithography.

Figure 8A:
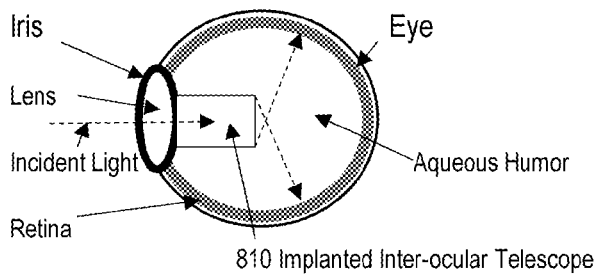
FIG. 8A depicts an example optical telescope apparatus, according to an embodiment of the present disclosure.

FIG. 8A depicts an example optical telescope apparatus 810, according to an embodiment of the present disclosure. The telescope apparatus 810 comprises an inter-ocular telescope, which may be implanted into the eye of an ophthalmology patient to augment vision. The telescope may be implanted behind the lens and iris and within the aqueous humor to support or augment vision by optically adjusting an image projected onto the retina by the lens.

Figure 8B:
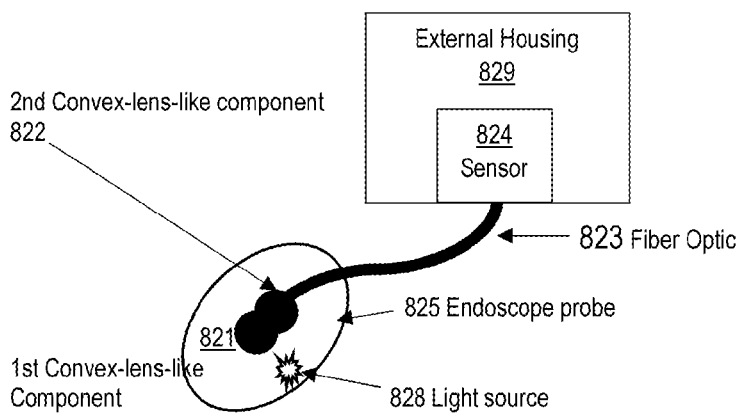
FIG. 8B depicts an example optical endoscope apparatus, according to an embodiment of the present disclosure.

FIG. 8B depicts an example optical endoscope apparatus 820, according to an embodiment of the present disclosure. The endoscope comprises a first convex-lens-like component 821 encapsulated with a light source 828 within a protective endoscope probe 825, which may be inserted within the body of a medical or surgical patient or a physiological subject or other biological specimen. The first convex-lens-like component 821 is coupled by a spacer separation optically to a second convex-lens-like component 822.

A fiber optic medium 823 couples the second convex-lens-like component 822 optically to an optical sensor 829, which is disposed in an external housing or other structure 829. The optical sensor 824 may comprise a charge coupled device (CCD) or an array of photodiodes.

Figure 8C:
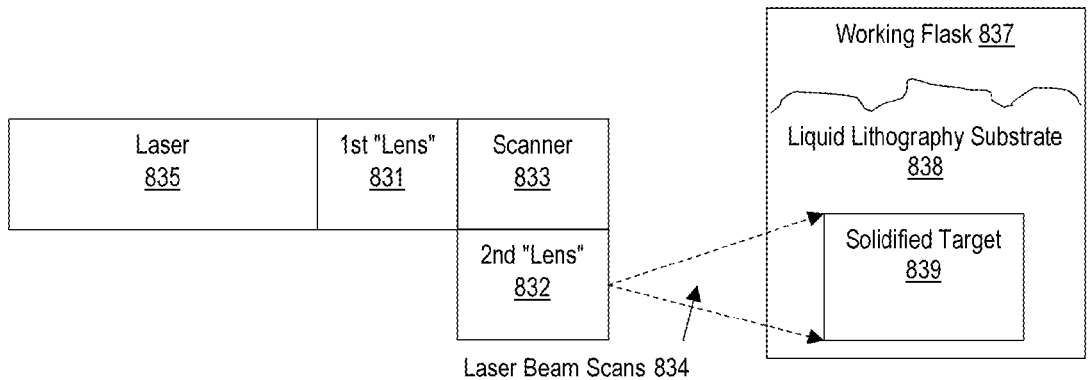
FIG. 8C depicts an example apparatus related to optical 3D laser lithography, according to an embodiment of the present disclosure.

FIG. 8C depicts an example apparatus 830 related to optical 3D laser lithography, according to an embodiment of the present disclosure. The lithography apparatus 830 comprises a laser 835. A first convex-lens-like component ("lens") 831 is coupled optically via a laser scanner 833 to a second convex-lens-like component 832.

The scanner 833 is operable for scanning a laser beam ("laser scans") 834 controllably, which is focused according to an embodiment to a tunably located focus over a volume of a liquid lithography substrate 838, such as a photosensitive polymeric substance stored in an optically accessible working flask 837. For focused laser scan 834 controllably solidifies a 3D target product 839 within the liquid substrate 838.

Example embodiments have thus been described in relation to optical devices for controllably focusing light. An example embodiment relates to an optical device comprising a substrate and a first metasurface disposed upon the substrate.

The first metasurface comprises a first high-contrast pattern operable for modifying, over a first phase profile, a phase front of a narrow-band or monochromatic collimated light beam incident to the first metasurface.

A second metasurface is disposed over a plane parallel to the first metasurface. The second metasurface comprises a second high-contrast pattern operable for shaping, over a second phase profile, the phase front of the modified phase front of the incident light beam into a converging spherical phase front.

A spacer layer, in which the modified phase front of the incident light beam diffracts is disposed in a separation between the first metasurface and the second surface.

The separation relates to a focus point of the converging spherical phase front beyond the second metasurface, relative to the first metasurface, in as direction of propagation of the incident light beam. Providing a change in the separation causes a corresponding significant change in the focus point.

Controllably changing the controllable separation between the first metasurface and the second metasurface by a first distance correspondingly changes the position of the focus point of the converging spherical phase front by a second distance, wherein the second distance exceeds the first distance to a significant degree Example embodiments of the present disclosure are thus described in relation to optical systems operable for controllably focusing light. In the foregoing specification, example embodiments have been described with reference to numerous specific details that may vary from one implementation to another. Thus, the sole and exclusive indicator of what is the invention, and is intended by the applicants to be the invention, is the set of claims that issue from this application, in the specific form in which such claims issue, including any subsequent correction.

Any definitions expressly set forth herein for terms contained in such claims shall govern the meaning of such terms as used in the claims. Thus, no limitation, element, property, feature or attribute that is not expressly recited in a claim should limit the scope of such claim in any way. The specification and drawings are, accordingly, to be regarded in an illustrative rather than a restrictive sense.

LIST OF REFERENCES

The following references are incorporated by reference within the specification:

[1] T. Krupenkin, S. Yang, and P. Mach, "Tunable liquid microlens," *Appl. Phys. Lett.*, vol. 82, pp. 316-318, 2003;

[2] N. Sugiura and S. Morita, "Variable-focus liquid-filled optical lens," *Appl. Opt.*, vol. 32, pp. 4181-4185, 1993;

[3] S.-Y. Lee, H.-W. Tung, W.-C. Chen, and W. Fang, "Thermal actuated solid tunable lens," *IEEE Photon. Technol. Lett.*, vol. 18, no. 21, pp. 2191-2193, November 2006;

[4] O. Pishnyak, S. Sato, and O. D. Lavrentovich, "Electrically tunable lens based on a dual-frequency nematic liquid crystal," *Appl. Opt.* 45(19), 4576-4582 (2006).

[5] A. Arbabi, Y. Horie, M. Bagheri, and A. Faraon. "Complete Control of Polarization and Phase of Light with High Efficiency and Sub-wavelength Spatial Resolution." arXiv preprint arXiv:1411.1494; Cornell University http://arxiv.org/abs/1411.1494 (2014).

[6] A. Arbabi, Y. Horie, A. J. Ball, M. Bagheri, and A. Faraon. "Subwavelength-thick Lenses with High Numerical Apertures and Large Efficiency Based on High Contrast Transmitarrays." arXiv preprint arXiv:1410.8261; Cornell University http://arxiv.org/abs/1410.8261 (2014).

What is claimed is:

1. An optical device, comprising:
   a substrate;
   a first metasurface disposed over the substrate, the first metasurface comprising a first high-contrast pattern operable for modifying, over a first phase profile, a phase front of a collimated narrow-band light beam incident to the first metasurface;
   a second metasurface disposed over a plane parallel to the first metasurface, the second metasurface comprising a second high-contrast pattern operable for shaping, over a second phase profile, the phase front of the modified phase front of the incident light beam into a converging spherical phase front; and
   a spacer layer in which the modified phase front of the incident light beam diffracts, the spacer layer disposed in a controllable separation between the first metasurface and the second surface, the separation relating to a position of a focus point of the converging spherical phase front beyond the second metasurface, in relation to the first metasurface in a direction of propagation of the incident light beam, wherein controllably changing the separation between the first metasurface and the second metasurface by a first distance correspondingly changes the position of the focus point of the converging spherical phase front by a second distance, wherein the second distance exceeds the first distance to a significant degree.

2. The optical device as described in claim 1 wherein the controllably changing the separation between the first metasurface and the second metasurface comprises one or more of a piezoelectrically actuated operation, an electrostatically actuated operation, an operation actuated by a modulation signal, or an actuation related to a micro-electromechanical system.

3. The optical device as described in claim 1 wherein the controllably changing the separation between the first metasurface and the second metasurface comprises tunably adjusting the first distance responsive to a modulation signal.

4. The optical device as described in claim 1 wherein the significant degree comprises a multiple of up to three orders of magnitude relative to the change in the separation.

5. The optical device as described in claim 1 wherein the substrate comprises silicon.

6. The optical device as described in claim 1, further comprising at least a first membrane disposed over the substrate wherein the first metasurface is disposed on the first membrane and optionally, a second membrane wherein the second metasurface is disposed on the second membrane.

7. The optical device as described in claim 6, wherein one or more of the first membrane or the second membrane comprises a free standing thin film material.

8. The optical device as described in claim 6 wherein one or more of the first membrane or the second membrane comprises at least one of silicon nitride or silicon dioxide.

9. The optical device as described in claim 1 wherein the narrow band light beam comprises monochromatic light.

10. The optical device as described in claim 1 wherein the narrow band comprises a portion of an infrared, visible or ultraviolet spectral region over which the optical device is operable.

11. The optical device as described in claim 1 wherein one or more of the first metasurface or the second metasurface comprises a periodic or quasi-periodic array of elements, each of which comprises a dimension smaller than a shortest wavelength of the narrow band.

12. The optical device as described in claim 11 wherein a refractive property of one or more of the first metasurface or the second metasurface relates to a parameter associated with the periodic or quasi-periodic arrays of each.

13. The optical device as recited in claim 12 wherein the parameter associated with the periodic or quasi-periodic array comprises one or more of:
 at least one of a size or a shape of a lattice feature of the periodic or quasi-periodic array; or
 at least one of a size or a shape of one or more of a plurality of unit elements, which comprise the lattice.

14. A method for fabricating an optical device, the method comprising:
 disposing a first metasurface over a substrate, the first metasurface comprising a first high-contrast pattern operable for modifying, over a first phase profile, a phase front of a collimated narrow-band or monochromatic light beam incident to the first metasurface;
 disposing a spacer layer over the first metasurface; and
 disposing a second metasurface over the spacer layer on a plane parallel to the first metasurface, the second metasurface comprising a second high-contrast pattern operable for shaping, over a second phase profile, the modified phase front into a converging spherical phase front, wherein the modified phase front of the incident light beam diffracts as it propagates through the spacer layer, which is disposed in a controllable separation between the first metasurface and the second surface, the controllable separation relating to a position of the focus point of the converging spherical phase front beyond the second metasurface, relative to the first metasurface in a direction of propagation of the incident light beam, wherein controllably changing the controllable separation between the first metasurface and the second metasurface by a first distance correspondingly changes the position of the focus point of the converging spherical phase front by a second distance, wherein the second distance exceeds the first distance to a significant degree.

15. The method as described in claim 14 wherein one or more of the disposing the first metasurface or the disposing the second metasurface comprises disposing a periodic or quasi-periodic array of elements, each of which comprises a dimension smaller than a wavelength corresponding to a wavelength of the monochromatic light or of the smallest wavelength of the narrow band,
 wherein an optical operating range of the optical device relates to a parameter characterizing one or more of the first metasurface or the second metasurface, and
 wherein the parameter of the one or more of the first metasurface or the second metasurface relates to one or more of:
  at least one of a size or a shape of a lattice associated with the one or more of the lens component or the mirror component; or
  at least one of a size or a shape of each of a plurality of unit elements, which comprise the lattice.

16. The method as recited in claim 14, further comprising:
 disposing at least a first membrane over the substrate, wherein the disposing the first metasurface comprises disposing the first metasurface on the at least first membrane; and
 optionally, disposing a second membrane on the spacer component over the plane parallel to the first metasurface, wherein the disposing the second metasurface comprises disposing the second metasurface on the second membrane.

17. The optical device as described in claim 16, wherein one or more of the first membrane or the second membrane comprises a free standing thin film material.

18. The optical device as described in claim 6 wherein one or more of the first membrane or the second membrane comprises at least one of silicon nitride or silicon dioxide.

19. An optical system, comprising:
 a first lens-like component operable for focusing a beam of light incident to the optical system to a first focal point beyond a surface of the first convex-lens-like component relative to a direction of propagation of the incident light beam; and
 at least a second convex-lens-like component operable for gathering at least a portion of the focused incident light beam from beyond the focal point of the first convex-lens-like component relative to a direction of propagation of the incident light beam, and for focusing the at least portion of the gathered incident light beam to a second focal point beyond a surface of the second convex-lens-like component relative to a direction of propagation of the incident light beam;
 wherein one or more of the first convex-lens-like component or the second convex-lens-like component comprises:
  a substrate;
  a first metasurface disposed upon the substrate, the first metasurface comprising a first high-contrast pattern operable for modifying, over a first phase profile, a phase front of a narrow-band collimated light beam incident to the first metasurface;
  a second metasurface disposed over a plane parallel to the first metasurface, the second metasurface comprising a second high-contrast pattern operable for shaping, over a second phase profile, the phase front of the modified phase front of the incident light beam into a converging spherical phase front; and
  a spacer layer in which the modified phase front of the incident light beam diffracts, the spacer layer disposed in a controllable separation between the first metasurface and the second surface, wherein the controllable separation relates to a focus of the converging spherical phase front beyond the second metasurface relative to the first metasurface, in as direction of propagation of the incident light beam, wherein controllably changing the controllable separation between the first metasurface and the second metasurface by a first distance correspondingly changes the position of the focus point of the converging spherical phase front by a second distance, wherein the second distance exceeds the first distance to a significant degree.

20. The optical system as described in claim 19, the system comprising a miniaturized apparatus, wherein the miniaturized apparatus comprises at least one of:
   a microscope;
   an endoscope;
   a telescope;
   a 3D laser lithography apparatus; or
   an apparatus related to stereolithography.

* * * * *